United States Patent [19]

Fuzzell

[11] 3,927,399

[45] Dec. 16, 1975

[54] BI-LEVEL CONDITION MONITOR USING REVERSE-BIASED CONTROL DIODES

[75] Inventor: Joe E. Fuzzell, Peoria, Ill.

[73] Assignee: Caterpillar Tractor Co., Peoria, Ill.

[22] Filed: Dec. 2, 1974

[21] Appl. No.: 528,754

[52] U.S. Cl. ............ 340/248 D; 331/65; 331/108 D; 340/59; 340/228 R; 340/248 A; 340/249
[51] Int. Cl.$^2$ ........................................ G08B 19/00
[58] Field of Search ........ 340/228 R, 248 A, 248 C, 340/248 D, 249; 317/148.5 R; 331/108 D, 65; 307/301

[56] References Cited
UNITED STATES PATENTS

| | | | |
|---|---|---|---|
| 2,956,268 | 10/1960 | Kline | 340/248 A |
| 3,166,678 | 1/1965 | Fleshman, Jr. et al. | 340/248 A |
| 3,184,729 | 5/1965 | Freedman et al. | 340/248 A |
| 3,284,788 | 11/1966 | Hudson | 340/239 R |
| 3,317,794 | 5/1967 | Kotheimer | 307/301 X |
| 3,801,866 | 4/1974 | Schmidgall | 331/108 D X |
| 3,864,608 | 2/1975 | Normile et al. | 317/148.5 R |

*Primary Examiner*—John W. Caldwell
*Assistant Examiner*—Daniel Myer
*Attorney, Agent, or Firm*—Phillips, Moore, Weissenberger Lempio & Strabala

[57] ABSTRACT

An integrated circuit timer connected for astable oscillation in response to the charging of a timing capacitor to the threshold level of the timer, the timer energizing an indicator light when in oscillation. A current bypass path with a diode therein is connected across the capacitor, the diode being reverse-biased to limit the level to which the capacitor may charge. A condition-responsive voltage, proportioned to and variable with the level of a monitored condition, is used to maintain the reverse bias of the diode at a level below the threshold level of the timer and thereby prevent oscillation of the timer when the condition is on one side of a predetermined level, and used to maintain the reverse bias of the diode at a level above the timer threshold so the timer may oscillate when the condition is on the other side of the predetermined level. Two such timers are used when two predetermined levels of the condition are to be detected, and the timers may be set into oscillation in response to rising or falling changes in the monitored condition.

11 Claims, 3 Drawing Figures

BI-LEVEL CONDITION MONITOR USING REVERSE-BIASED CONTROL DIODES

STATEMENT OF THE INVENTION

This invention relates to monitoring systems and in particular to a solid state system wherein a sensible indication is to be given to an operator when the condition being monitored changes from one side of a predetermined level of operation to the other side of said level.

A specific example of the use of such a system is in vehicles wherein the battery-alternator system will normally operate within a desired range of voltage and the operator is to be warned if the voltage rises above or falls below the limits of the desired range. Another example of the use of such a system is the monitoring of the coolant system of a vehicle wherein a warning indicator is to be actuated when the temperature of the coolant rises above the upper limit of normal operation and wherein a danger indicator is to be actuated if the coolant temperature rises to and above an even higher danger level.

In general, the monitoring system of the present invention utilizes a solid state integrated circuit timer for each critical level of condition to be detected, the timer being connected for astable oscillation and triggered into oscillation when the charge of a timing capacitor rises to the threshold level of the timer. Oscillation of the timer then energizes an indicator, preferably a light-emitting diode, to provide a sensible indication to the operator.

It is a particular feature of the present invention that each timer is provided with a current bypass path connected across the capacitor, the bypass path having a reverse-biased diode therein. During normal operation, when no indication is to be given, the reverse bias on the diode is maintained at a level below the threshold level of the timer so that the capacitor cannot charge to a level high enough to start the timer into oscillation. When the monitored condition changes so that the condition is outside of the normal range, a voltage proportional to the level of the monitored condition is used to maintain the reverse bias on the diode at a level above the timer threshold. The capacitor can then charge to a level sufficient to start the timer into oscillation and turn on the indicator light.

It is another feature of the present invention that the timer can be triggered into oscillation in response to either a rising or falling condition-responsive voltage, depending on whether the condition-responsive voltage is used to vary the level of reverse bias on the diode or to vary the threshold level of the timer.

A further feature of the invention is that a plurality of timers can be used, all responsive to changes in the level of the condition being monitored, the timers being independently adjustable so that the level at which one timer is to be set into oscillation will not affect the level at which another timer is to operate.

Yet another feature of the invention is that the timers are arranged so that only one indicator light is lit at a time.

A still further feature of the invention is that the circuit may be easily tested at any time by increasing the reverse bias on all bypass-path diodes in the system to a level above the timer thresholds to start all timers into oscillation and to light up their indicator lights. Failure of an indicator light to be lit when tested indicates a component failure.

Other features and advantages of the invention will be apparent in the course of the following detailed description.

BRIEF DESCRIPTION OF THE DRAWINGS

In the drawings, wherein like parts are designated by like reference numerals throughout the same.

DESCRIPTION OF PREFERRED EMBODIMENTS

Figure 3:
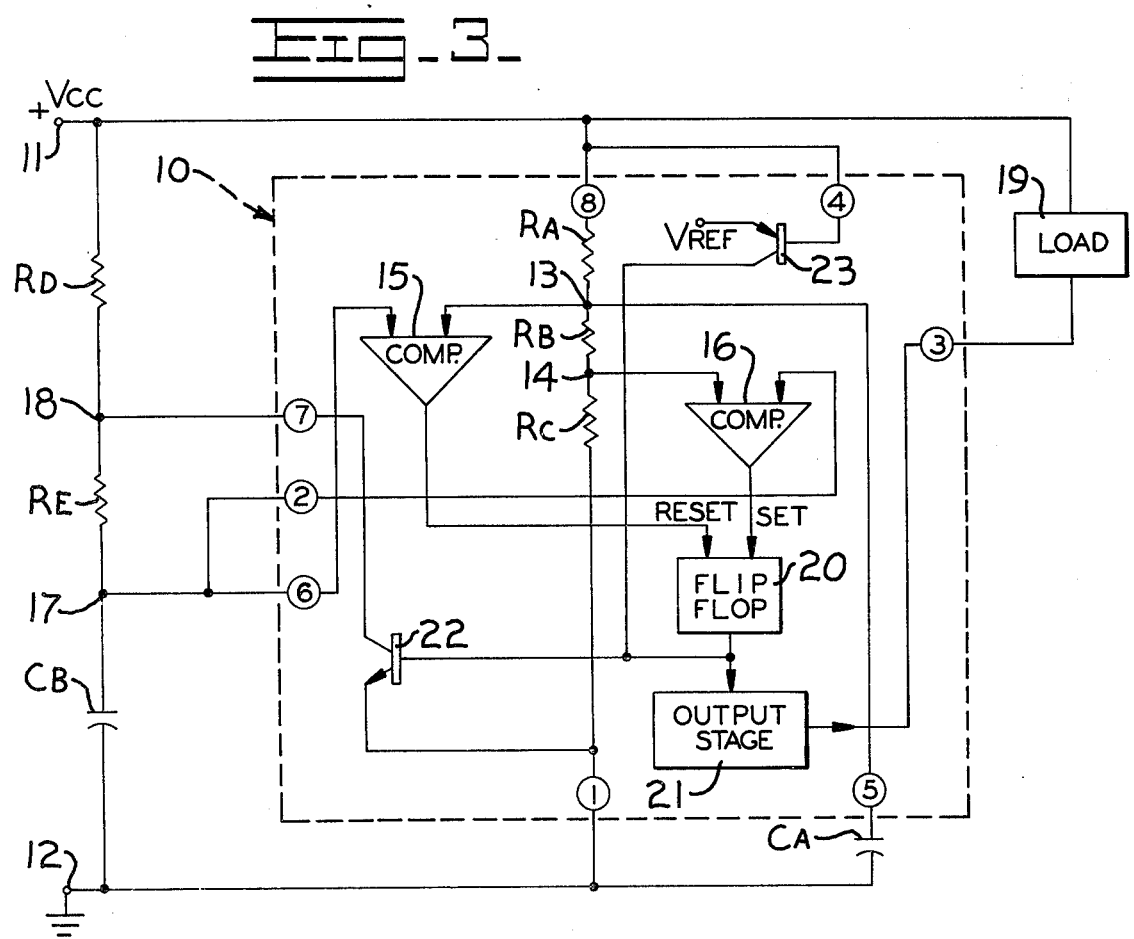
FIG. 3 is a block diagram of an integrated circuit timer connected for astable operation, such timer being utilized in the circuits of FIGS. 1 and 2.

FIG. 3 shows in block digram form a commercially available Signetics SE555 monolithic linear integrated timer circuit 10 with external components connected to its pins 1 through 8 for astable operation as a free-running multivibrator. Pins 8 and 1 of timer 10 are connected to positive and negative terminals 11 and 12 of a direct current power source $V_{cc}$ so that current may flow through the series-connected resistors $R_A$, $R_B$ and $R_C$. These three resistors are of equal value, so that when external stabilizing capacitor $C_A$ has charged on start-up, the voltage at junction 13 between $R_A$ and $R_B$ will be two-thirds of the supply voltage $V_{cc}$ and the voltage at junction 14 between $R_B$ and $R_C$ will be one-third $V_{cc}$. The voltages at junctions 13 and 14 are used to reference the two comparators 15 and 16 respectively.

External resistors $R_D$ and $R_E$ and capacitor $C_B$ are connected in series between power source terminals 11 and 12. Junction 17 between $C_B$ and $R_E$ is connected to both the trigger pin 2 and the threshold pin 6 of the timer 10, while junction 18 is connected to the discharge pin 7. A suitable load 19 is connected between the positive power source terminal 11 and the output pin 3 of the timer 10.

Comparator 15 produces a reset signal to flip-flop 20 in response to a rising voltage at the threshold pin 6 when such voltage is equal to the two-thirds $V_{cc}$ reference voltage at junction 13. The reset signal causes flip-flop 20 to have a high output. In turn, this causes the output stage 21 to have a low output at output pin 3 and causes the discharge transistor 22 to become conductive. Comparator 16 produces a set signal to flip-flop 20 in response to a falling voltage at the trigger pin 2 when such voltage falls to the one-third $V_{cc}$ reference voltage at junction 14. The set signal causes flip-flop 20 to have a low output which turns the discharge transistor 22 off and also causes the output stage 21 to have a high output at output pin 3.

In operation, capacitor $C_B$ will charge through resistors $R_D$ and $R_E$. When the voltage across $C_B$ reaches two-thirds $V_{cc}$, comparator 15 produces a reset signal. The consequent low voltage at output pin 3 causes current to flow through load 19. The discharge transistor 22 is also turned on, allowing capacitor $C_B$ to discharge through resistor $R_E$. When the voltage across $C_B$ falls to one-third $V_{cc}$, this voltage, applied to the trigger pin 2, causes comparator 16 to produce a set signal to flip-flop 20. The output pin 3 goes high so that current through load 19 ceases. The discharge transistor 22 is turned off so that capacitor $C_B$ will again charge through resistors $R_D$ and $R_E$ to continue cycling operation. Thus, capacitor $C_B$ charges through resistors $R_D$ and $R_E$ but discharges through only resistor $R_E$. The values of these two resistors determine the frequency of oscillation while the ratio of the values determines the duration of on-time versus off-time during oscillation.

The reset pin 4 is connected to $V_{cc}$ along with pin 8 so as to prevent the reset transistor 23 from turning on, thereby preventing false triggering of the timer 10 when connected for astable operation.

Figure 1:
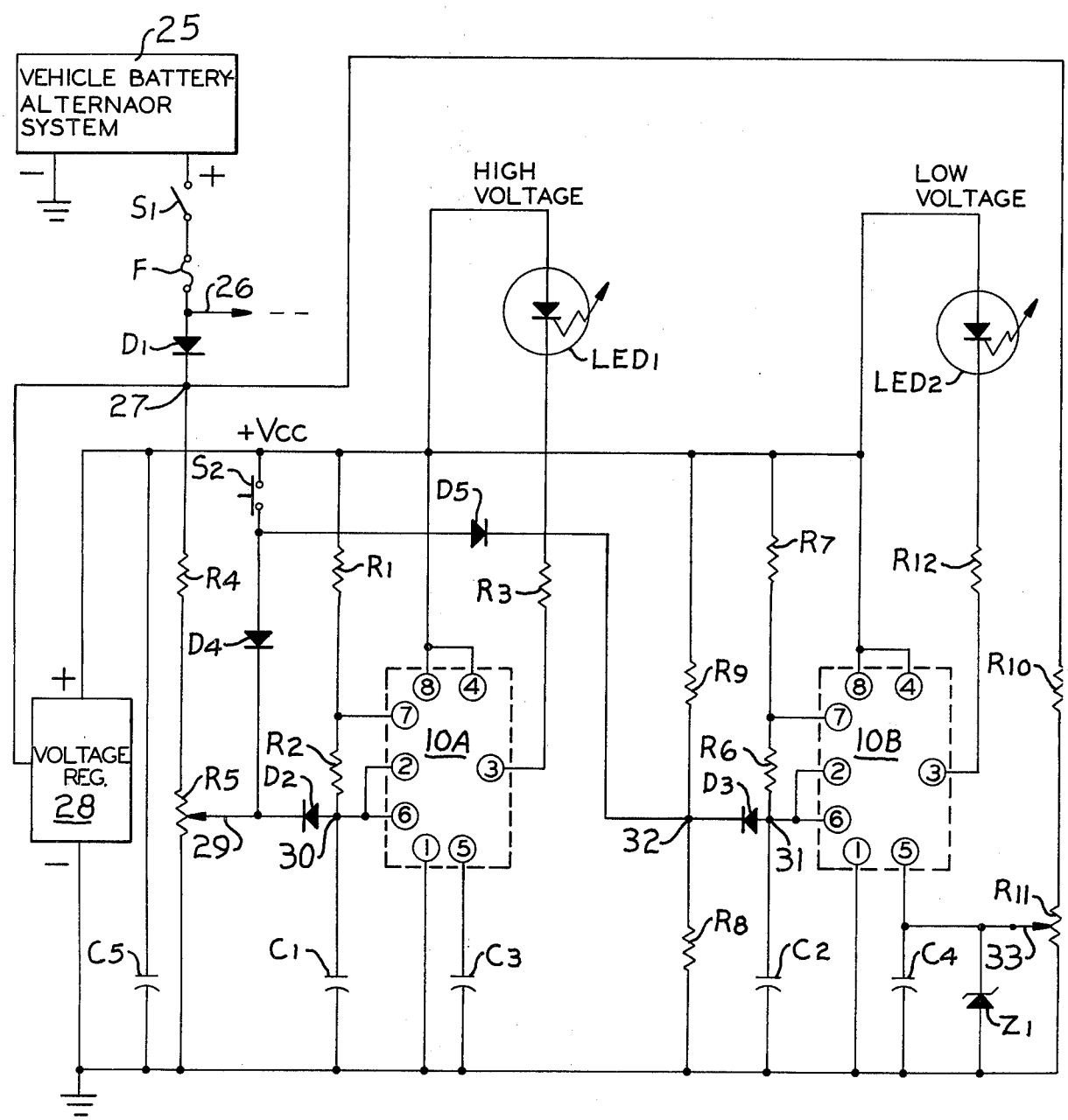
FIG. 1 is a schematic wiring diagram of a circuit for indicating two distinct voltage levels in a vehicle electrical system.

Referring now to FIG. 1, this circuit shows the use of two timers 10A and 10B, each identical to the timer 10 of FIG. 3, and connected as astable oscillators, to indicate existence of high and low voltage levels in a vehicle electrical system.

The positive terminal of the vehicle battery-alternator system 25 of the vehicle is connected by main switch $S_1$ and fuse F to the power distribution line 26 of the vehicle. The positive voltage also appears through diode $D_1$ at junction 27 and is applied to voltage regulator 28 which supplies a regulated voltage $V_{cc}$ to the control system. For purposes of illustration it is desirable that the output of the battery-alternator system be maintained within a given range, e.g., between 22 and 32 volts, and that the operator of the vehicle be warned if the system is not operating within that range, i.e., if the voltage rises above 32 volts or falls below 22 volts. The voltage regulator 28 may be set so that its output $V_{cc}$ is 12 volts.

The threshold pin 6, trigger pin 2 and discharge pin 7 of timer 10A are connected to the junctions of the series-connected resistors $R_1$ and $R_2$ and capacitor $C_1$ for astable oscillation, as previously described. A light-emitting diode $LED_1$ is connected from $V_{cc}$ through current-limiting resistor $R_3$ to the output pin 3 of timer 10A and will emit a visible light signal during each portion of the cycle of oscillation of timer 10A when the output pin 3 has a low output.

Resistor $R_4$ and potentiometer $R_5$ are connected in series from ground to junction 27 and thus a condition-responsive voltage will be present at the wiper 29 of potentiometer $R_5$ which is proportional to the battery-alternator system voltage at junction 27 and will vary therewith. The wiper 29 is connected through diode $D_2$ to the junction 30 between $C_1$ and $R_2$. The diode $D_2$ and the portion of the potentiometer $R_5$ between wiper 29 and ground thus form a current bypass path across capacitor $C_1$. Diode $D_2$ will conduct whenever the voltage at junction 30 is higher than at the potentiometer wiper 29 and will be reversely biased against conduction when the voltage at junction 30 is lower than at the potentiometer wiper. When the voltage at junction 27 is at the upper end of the desired range, i.e., 32 volts, wiper 29 is adjusted so that the voltage thereat is slightly below two-thirds $V_{cc}$, i.e., 8 volts.

As long as the battery-alternator voltage is below 32 volts, the voltage at the potentiometer wiper 29 will be below two-thirds $V_{cc}$, and capacitor $C_1$ can only charge to that level. If the voltage level at the potentiometer wiper drops, capacitor $C_1$ will discharge through diode $D_2$. As a consequence the voltage applied to the threshold pin 6 of timer 10A will be held below that required to start operation of timer 10A. The output pin 3 will remain high and the high voltage indicator $LED_1$ will remain off.

If the battery-alternator system voltage rises above 32 volts, the condition-responsive voltage at the potentiometer wiper 29 will rise accordingly and will rise above two-thirds $V_{cc}$ to provide a correspondingly high reverse bias on diode $D_2$. Capacitor $C_1$ is now free to charge to a higher level and will charge up to the two-thirds $V_{cc}$ threshold level of timer 10A. At that time it will start timer 10A into oscillation, allowing current pulses to flow through $LED_1$. The oscillation of timer 10A and the energization of $LED_1$ will continue as long as the battery-alternator system voltage remains above 32 volts. The light-emitting diode $LED_1$ will be mounted on the instrument panel of the vehicle and will thus warn the operator that the battery-alternator system is operating at an undersirably high voltage level.

If the battery-alternator voltage level then drops below 32 volts, capacitor $C_1$ will again be prevented from rising to two-thirds $V_{cc}$ after a discharge thereof to one-third $V_{cc}$. As a consequence, timer 10A will not be triggered itno oscillation and $LED_1$ will stay off.

A low-level voltage indicator utilizes the timer 10B. Again the threshold, trigger and discharge pins 6, 2 and 7 are connected to the junctions between capacitor $C_2$, and resistors $R_6$ and $R_7$ for astable oscillation. Junction 31, between $C_2$ and $R_6$, is connected through diode $D_3$ to junction 32 between resistors $R_8$ and $R_9$ which are connected in series between ground and $V_{cc}$. With the battery-alternator voltage at the desired low level, e.g., 22 volts, resistors $R_8$ and $R_9$ are selected so that the voltage at junction 32 is above two-thirds $V_{cc}$, e.g., about 10 volts when two-thirds $V_{cc}$ is 8 volts. This normally would permit capacitor $C_2$ to charge to a level sufficient to cause oscillation of timer 10B and energization of the low voltage light-emitting diode $LED_2$.

However, the timer 10B is externally connected so that a control voltage can be applied to the control voltage pin 5 thereof to vary the threshold level required for causing the timer to oscillate. Resistor $R_{10}$ and potentiometer $R_{11}$ are connected in series between junction 27 and ground so that a voltage proportioned to that at junction 27 will appear at the potentiometer wiper 33 which is connected to the control voltage pin 5 of timer 10B.

The internal circuitry of timer 10B (see FIG. 3) is arranged such that an application of a control voltage at pin 5 will move the voltage at junctions 13 and 14 up or down depending on whether the control voltage is higher or lower than two-thirds $V_{cc}$, and thus change the reference voltages applied to comparators 15 and 16.

If the voltage at pin 5 is at two-thirds $V_{cc}$, the threshold point of comparator 15 is unaffected, and oscillation will start when capacitor $C_2$ charges to two-thirds $V_{cc}$.

With a reverse bias of 10 volts (for example) being applied to diode $D_3$, potentiometer $R_{11}$ is adjusted to cause timer 10B to oscillate when the battery-generator voltage at junction 27 is just below 22 volts. At this point the control voltage at pin 5 will be approximately 10 volts, setting the threshold of comparator 15 at 10 volts. Since capacitor $C_2$ is permitted by the reverse bias on diode $D_3$ to charge to 10 volts, the timer can oscillate and pulses of current can flow through $LED_2$ and resistor $R_{12}$. Obviously, if the control voltage at pin 5 is less than 10 volts, as will be the case if the battery-alternator voltage drops to less than 22 volts, the timer 10B will oscillate.

In normal operation, i.e., when the battery-alternator system is operating at a voltage higher than 22 volts, the control voltage at pin 5 will be above 10 volts, thereby raising the threshold level on comparator 15, and requiring a correspondingly higher charge on capacitor $C_2$ to start oscillation. However, diode $D_3$ will conduct if capacitor $C_2$ charges to slightly more than 10 volts to thus complete the current bypass path around capacitor $C_2$ and thus prevent further charging of the capacitor. As a consequence, the timer 10B will not oscillate and $LED_2$ will remain de-energized as long as the battery-alternator voltage remains above 22 volts.

If the battery-alternator voltage drops below 22 volts, the threshold level of timer 10B will be below the level of reverse bias on diode $D_3$ and the timer 10B will go into oscillation to light $LED_2$.

Zener diode $Z_1$ is connected from pin 5 to ground and is selected to conduct when the voltage thereacross is somewhat higher than the voltage at junction 32. Zener diode $Z_1$ will permit the level at pin 5 to be raised sufficiently by a rise in battery-alternator voltage above 22 volts so that oscillation of the timer 10B will be prevented, but will limit the voltage applied to pin 5 beyond that point so that the internal circuitry of timer 10B will be protected against overload.

A test switch $S_2$ permits simultaneous checking of both the high- and low-level voltage portions of the indicator circuit. Closing $S_2$ applies full $V_{cc}$ through diodes $D_4$ and $D_5$ to the cathodes of diodes $D_2$ and $D_3$ respectively. As a result both diodes $D_2$ and $D_3$ are reversely biased above their normal bias levels, thus allowing capacitors $C_1$ and $C_2$ to charge to the threshold levels for their respective timers 10A and 10B. Both timers will then oscillate and both light-emitting diodes $LED_1$ and $LED_2$ will be energized. Failure of either or both to light will indicate a component failure.

Capacitors $C_3$ and $C_4$ connect between ground and the control voltage pins 5 of timers 10A and 10B for stabilization purposes. Capacitors $C_5$ is connected across voltage regulator 28 also for stabilization purposes.

Figure 2:
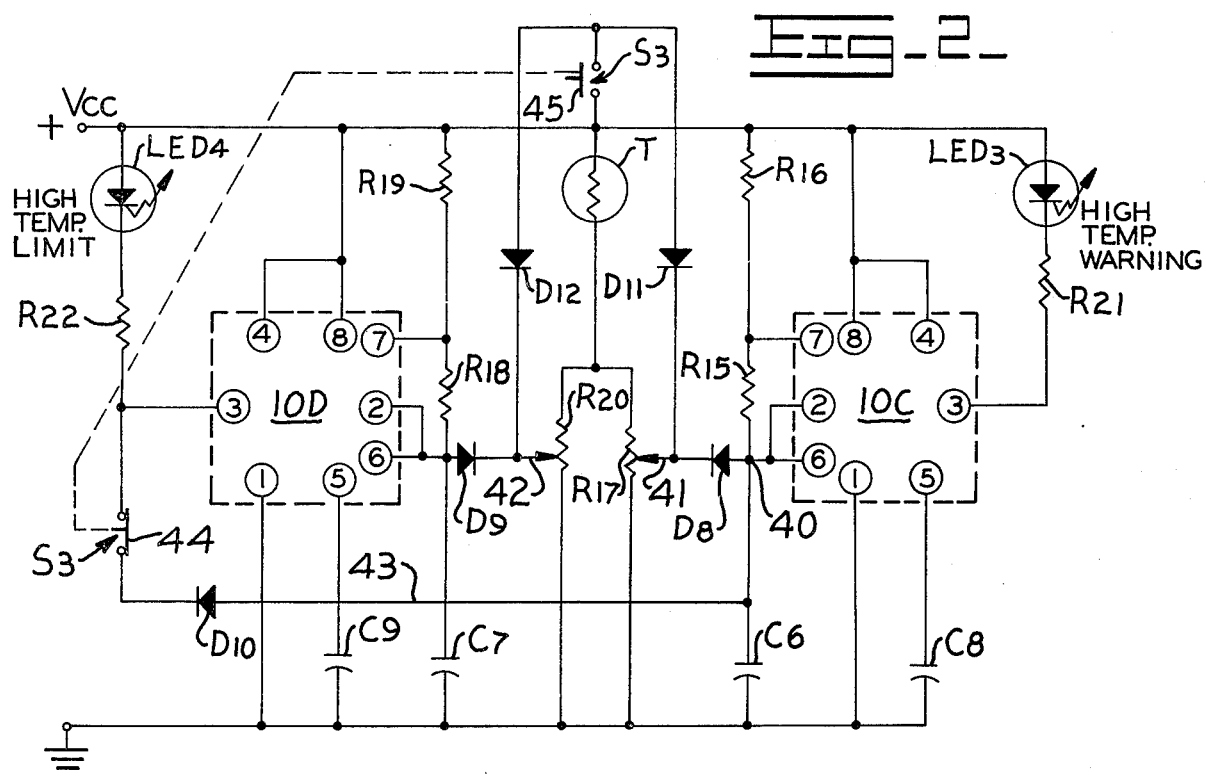
FIG. 2 is a schematic wiring diagram of a circuit for indicating two distinct temperature levels in a fluid system.

The circuit shown in FIG. 2 utilizes two timers 10C and 10D, again of the type shown in FIG. 3, which energize two light-emitting diodes $LED_3$ and $LED_4$ to give an indication of two levels of a condition. The circuit herein shown is typical for an engine coolant temperature indicator wherein it is desirable to indicate when coolant temperature exceeds a predetermined value, e.g., 200°F., to notify the operator and warn him that an abnormally high temperature level has been reached. This temperature warning is to remain on until the coolant temperature rises to a temperature which will be harmful to further operation, e.g., 300°F., at which time the warning light (usually amber in color) goes off and a red light goes on to notify the operator to discontinue operations.

Timer 10C has its threshold, trigger and discharge pins 6, 2 and 7 connected to the junctions of capacitor $C_6$ and resistors $R_{15}$ and $R_{16}$ for astable oscillation. The junction 40 between $C_6$ and $R_{15}$ is connected through diode $D_8$ to the wiper 41 of potentiometer $R_{17}$ which is connected in series with thermistor T between ground and $V_{cc}$. The supply voltage $V_{cc}$ is taken from a suitable regulated direct current power source. Thermistor T has a negative coefficient of resistance and is immersed in the fluid whose temperature is to be monitored.

With the monitored fluid at 200°F. (or a dummy resistor of the value equivalent to that of the termistor T at 200°F. substituted for thermistor T) the wiper of potentiometer $R_{17}$ is set to reverse-bias diode $D_8$ at a level just above two-thirds $V_{cc}$. Capacitor $C_6$ can therefore charge to the threshold level of timer 10C so that it can oscillate and activate the warning light $LED_3$. This light is preferably set in back of an amber-colored lens. The values of C, $R_{15}$ and $R_{16}$ are selected so that the timer 10C will oscillate at about 11 hertz.

As the temperature of the monitored fluid increases, the resistance of thermistor T will decrease so that the voltage at potentiometer wiper 41 will increase. Thus, timer 10C will oscillate and the amber warning light $LED_3$ will be energized when the temperature rises to 200°F. or above.

If the temperature drops below 200°F., the resistance of thermistor T will increase, lowering the reverse bias on diode $D_3$ so that capacitor $C_6$ cannot charge up to the threshold level to cause oscillation of timer 10C and the warning light $LED_3$ will go off.

The high-level timer 10D is also connected to an RC circuit comprised of capacitor $C_7$ and resistors $R_{18}$ and $R_{19}$ for astable oscillation. The wiper 42 of potentiometer $R_{20}$, which is also in series with thermistor T, is adjusted to reverse-bias diode $D_9$ at a level just above two-thirds $V_{cc}$ when the monitored fluid is at 300°F. Thus, when the temperature exceeds 300°F., capacitor $C_7$ can charge sufficiently to cause timer 10D to go into oscillation and energize the limit light $LED_4$. This light is preferably set in back of a red colored lens. The values of $C_7$, $R_{18}$ and $R_{19}$ are selected so that timer 10D will oscillate at about 12.5 hertz.

Timer 10D will oscillate and light $LED_4$ will be energized at all temperature levels above 300°F. If the temperature is below 300°F., capacitor $C_7$ will discharge through diode $D_9$ and potentiometer $R_{20}$ before the voltage across capacitor $C_7$ can reach a level sufficient to cause timer 10D to oscillate, and the light $LED_4$ will be off.

After initial calibration of the circuit by the potentiometers $R_{17}$ and $R_{20}$, if the temperature of the monitored fluid is below 200°F., both lights will be off. As the temperature rises, the thermistor resistance decreases, causing the reverse bias to both doides $D_8$ and $D_9$ to increase. At the 200°F. point, the bias for diode $D_8$ rises above two-thirds $V_{cc}$ activating timer 10D to energize the amber warning light $LED_3$ at an 11 hertz rate.

When fluid temperature reaches 300°F., the reverse bias to diode $D_9$ also reaches two-thirds $V_{cc}$ so that timer 10D is activated to energize the red light $LED_4$ at a 12.5 hertz rate.

Conductor 43 connects the positive side of capacitor $C_6$ through diode $D_{10}$ and the normally closed contacts 44 of test switch $S_3$ to the output pin 3 of timer 10D to provide a discharge circuit for capacitor $C_6$. When timer 10D is in oscillation its output pin 3 is driven low at a 12.5 hertz frequency which is greater than the 11 hertz frequency of charging of capacitor $C_6$. As a consequence, capacitor $C_6$ will repeatedly discharge through diode $D_{10}$ so that it is prevented from charging to two-thirds $V_{cc}$. This causes timer 10C to stop oscillating and turns off the warning light $LED_3$, leaving only the light $LED_4$ on. Diode $D_{10}$ prevents the high voltage at pin 3 of timer 10D from affecting operation of timer 10C.

If the fluid temperature drops below 300°F., timer 10D shuts off, with its output pin 3 high. This shuts off the red light $LED_4$ and prevents further discharge of capacitor $C_6$ through diode $D_{10}$. Timer 10C again goes into oscillation, turning on the amber warning light $LED_3$. Timer 10C and light $LED_3$ both go off if the monitored temperature drops below 200°F.

Test switch $S_3$ enables the operator to check the functioning of both lights $LED_3$ and $LED_4$. When the switch is operated, the normally open contacts 45 close to supply $V_{cc}$ through diodes $D_{11}$ and $D_{12}$ to diodes $D_8$ and $D_9$. The increased reverse bias across diodes $D_8$ and $D_9$ causes both timers 10C and 10D to go into oscillation to light $LED_3$ and $LED_4$. The operation of test switch $S_3$ also opens its normally closed contacts 44 so that operation of timer 10D will not cause timer 10C to cease operation. Thus, failure of either $LED_3$ or $LED_4$ to light indicates a malfunction of the circuit.

As in FIGS. 1 and 3, capacitors $C_8$ and $C_9$ connect between ground and the control voltage pins 5 of timers 10C and 10D for stablization purposes. Current-limiting resistors $R_{21}$ and $R_{22}$ are provided in the circuits to $LED_3$ to $LED_4$.

As may be seen from the foregoing, the circuits of FIGS. 1 and 2 both provide a means for monitoring a changing condition and for indicating when the condition changes from one side of a predetermined first level to the other side thereof and for indicating when the condition changes from one side of predetermined second level to the other side thereof.

The circuit of FIG. 1 is illustrative of a monitoring system wherein normal operation is to be confined to a desired range in operating condition and an indication is to be given when the operation goes above or below the normal range. The circuit of FIG. 2 is illustrative of a monitoring system wherein it is desired to give indications of the condition changing consecutively through two predetermined levels. In both circuits the potentiometers will produce at the wipers thereof a condition-responsive voltage which will be proportional to, and which will vary in accordance with, changes in the condition being monitored.

Although the two circuits differ in that timers 10A, 10C and 10D each start into operation in response to a rise in the condition-responsive voltage applied thereto wherein timer 10B starts into operation in response to a falling condition-responsive voltage, the operation of all timers is basically the same. That is, the charging capacitor of each timer has a current bypass path connected thereacross, the bypass path having a diode therein. In each instance during the time that the timer is to be off the diode is reverse-biased to a level below the threshold level of the timer so that the charging capacitor cannot charge to the threshold voltage. In each case when the condition-responsive voltage is at a level wherein the timer should operate to indicate the condition, the reverse bias on the diode is at a level above the threshold level of the oscillator.

When the timer is to go into oscillation in response to a rise in the level of the condition-responsive voltage, the threshold voltage of the timer is held constant and the condition-responsive voltage is applied directly to the diode connected to the charging capacitor, as with timers 10A, 10C and 10D herein. The level of the reverse bias on the diode is thus dependent on the level of the condition-responsive voltage and when the condition-responsive voltage rises, the level of reverse bias rises until it is at the threshold level. The capacitor can then charge to that level and start the timer into operation.

When the timer is to go into oscillation in response to a fall in the level of the condition-response voltage, as with timer 10B herein, the reverse bias on the diode is held constant and the condition-responsive voltage is applied to the timer to vary the threshold level. As long as the condition-responsive voltage is above the critical level the reverse bias on the diode will be at a level below the threshold level and the timer will not oscillate. If the condition-responsive voltage falls below the critical level, then the threshold level falls correspondingly so that the reverse bias is at a level higher than the threshold level and the timer will go into oscillation.

Thus, the desired results will be achieved if: (a) the threshold level is held constant and the reverse-bias level is varied, or (b) the reverse-bias level is held constant and the threshold level is varied. In either case, operation of the timer and its indicator light will be inhibited if the reverse-bias level is below the threshold level, while oscillation of the timer and energization of its indicator light will occur when the reverse-bias level is above the threshold level.

I claim:

1. A circuit for monitoring a changing condition and for indicating when said condition has changed from one side of a predetermined level to the other side thereof, said circuit comprising:
    an astable oscillator means having a threshold level for initiation of oscillation and including a series-connected capacitor and resistor across a regulated supply voltage, said capacitor being chargeable through said resistor and said oscillator means being activated into oscillation in response to the charging of said capacitor to said threshold level,
    an indicator means energized in response to oscillation of said oscillator means,
    a current bypass path connected across said capacitor and having a diode therein,
    means for reverse-biasing said diode at a level less than said threshold level when said condition being monitored is on one side of said predetermined level and for reverse-biasing said diode at a level higher than said threshold level when said condition is on the other side of said predetermined level.

2. A circuit as set forth in claim 1 and further including:
    means for producing a condition-responsive voltage proportional to the level of said condition being monitored and variable in response to changes in said condition, and
    wherein said condition-responsive voltage is applied directly to said diode to provide the reverse-biasing thereof and to vary the level of said reverse bias in accordance with changes in level of said condition-responsive voltage.

3. A circuit as set forth in claim 1 and further including:
    means for producing a condition-responsive voltage proportional to the level of said condition being monitored and variable in response to changes in said condition,
    wherein said condition-responsive voltage is applied to said oscillator means to vary the threshold level thereof in accordance with changes in the level of said condition-responsive voltage, and
    wherein said reverse bias is maintained at a fixed level.

4. A circuit as set forth in claim 1, and further including:
a test switch,
means responsive to actuation of said switch for applying a reverse bias to said diode of a level greater than said threshold level.

5. A circuit for monitoring a changing condition and for indicating when said condition has changed from one side of a first predetermined level to the other side thereof and for subsequently indicating when said condition has changed from one side of a second predetermined level to the other side thereof, said circuit comprising:
first and second astable oscillator means each having a threshold level for initiation of oscillation thereof and each including a series-connected capacitor and resistor across a regulated supply voltage, said capacitor being chargeable through said resistor and each oscillator means being activated into oscillation in response to the charging of its capacitor to said threshold level,
first and second indicator means energized by oscillation of said first and second oscillator means respectively,
first and second current bypass paths connected across capacitors of said first and second oscillator means respectively, each bypass path having a diode therein,
means for reverse-biasing the diode of said first bypass path at a level less than the threshold level of said first oscillator means when said condition being monitored is on one side of said first predetermined level and for reverse-biasing said diode at a level greater than said threshold level when said condition is on the other side of said first predetermined level,
means for reverse-biasing the diode of said second bypass path at a level less than the threshold level of said second oscillator means when said condition being monitored is on one side of said second predetermined level and for reverse-biasing said diode at a level greater than said threshold level when said condition is on the other side of said second predetermined level.

6. A circuit as set forth in claim 5 and further including:
means for producing first and second condition-responsive voltages, each proportional to the level of the condition being monitored and variable in response to changes in said condition,
wherein said first condition-responsive voltage is applied directly to said diode of said first bypass path to provide the reverse-biasing thereof and to vary the level of said reverse bias in accordance with changes in level of said first condition-responsive voltage,
wherein said reverse bias on the diode of said second bypass path is maintained at a fixed level, and
wherein said second condition-responsive voltage is applied to said second oscillator means to vary the theshold level thereof in accordance with changes in level of said second condition-responsive voltage.

7. A circuit as set forth in claim 5 wherein the condition being monitored is a variable voltage, and further including:
first and second potentiometers each connected across said variable voltage,
wherein the wiper of said first potentiometer is connected directly to the diode of said first bypass path to provide the reverse-biasing thereof and to vary the reverse bias in accordance with changes in said variable voltage,
wherein said reverse bias on the diode of said second bypass path is maintained at a fixed level, and
wherein the wiper of said second potentiometer is connected to said second oscillator means to vary the theshold level thereof in accordance with changes in the level of said variable voltage.

8. A circuit as set forth in claim 5, and further including:
means for producing first and second condition-responsive voltages, each proportional to the level of said condition being monitored and variable in response to changes in said condition,
wherein said first condition-responsive voltage is applied directly to said diode of said first bypass path to provide the reverse-biasing thereof and to vary the level of said reverse bias in accordance with changes in level of said first condition-responsive voltage, and
wherein said second condition-responsive voltage is applied directly to said diode of said second bypass path to provide the reverse-biasing thereof and to vary the level of the reverse bias in accordance with changes in level of said second condition-responsive voltage.

9. A circuit as set forth in claim 8, wherein said second oscillator means oscillates at a higher frequency than said first oscillator means, and further including:
a discharge circuit for the capacitor of said first oscillator,
means responsive to oscillation of said second oscillator means for repeatedly connecting said discharge circuit across the capacitor of said first oscillator at a rate equal to the frequency of oscillation of said second oscillator means.

10. A circuit as set forth in claim 5 and further including:
first and second potentiometers connected in parallel;
a thermistor connected in series with said parallel connected potentiometers, said thermistor and potentiometers being connected across a regulated voltage source,
wherein the wipers of said first and second potentiometers are connected directly to the diodes of said first and second bypass paths, respectively, to provide the reverse-biasing thereof and vary the reverse bias in accordance with changes in resistance of said thermistor.

11. A circuit as set forth in claim 5, and further including:
a test switch,
means responsive to actuation of said test switch for applying a reverse bias to both diodes of said first and second bypass path of a level greater than the threshold levels of said first and second oscillator means.

* * * * *